(12) United States Patent
Yamamoto

(10) Patent No.: US 10,495,660 B2
(45) Date of Patent: Dec. 3, 2019

(54) ROTATIONAL SPEED DISPLAY DEVICE

(71) Applicant: Nissan Motor Co., Ltd., Yokohama-shi, Kanagawa (JP)

(72) Inventor: Yoshinori Yamamoto, Kanagawa (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 31 days.

(21) Appl. No.: 15/747,454

(22) PCT Filed: Sep. 16, 2015

(86) PCT No.: PCT/JP2015/076229
§ 371 (c)(1),
(2) Date: Jan. 25, 2018

(87) PCT Pub. No.: WO2017/046880
PCT Pub. Date: Mar. 23, 2017

(65) Prior Publication Data
US 2018/0217177 A1   Aug. 2, 2018

(51) Int. Cl.
*G01P 3/46* (2006.01)
*B60K 35/00* (2006.01)
(Continued)

(52) U.S. Cl.
CPC .............. *G01P 3/465* (2013.01); *B60K 35/00* (2013.01); *G01P 1/04* (2013.01); *B60R 16/0231* (2013.01)

(58) Field of Classification Search
CPC ..... B60K 35/00; B60R 16/02; B60R 16/0231; F02D 45/00; F16H 2059/366;
(Continued)

(56) References Cited

U.S. PATENT DOCUMENTS 5,719,768 A * 2/1998 Tashiro ............... F16H 61/143
192/3.3
2004/0082434 A1* 4/2004 Segawa ............... F16H 61/143
477/62
(Continued)

FOREIGN PATENT DOCUMENTS

JP    H10-238623 A    9/1998
JP    2009-220678 A   10/2009
(Continued)

*Primary Examiner* — Carl C Staubach
(74) *Attorney, Agent, or Firm* — Drinker Biddle & Reath LLP

(57) ABSTRACT

An actual slip amount (S) of a torque converter is calculated by subtracting an actual input shaft rotational speed (Nr) of an automatic transmission from an engine rotational speed (Ne), which is the rotational speed of a crankshaft. Then, an engine rotational speed for display (Nd) is calculated by adding a slip amount adjusted for display (Sp), which is obtained by applying a predetermined correction process to the actual slip amount (S) to the actual input shaft rotational speed (Nr). The above described correction process may be a first-order-lag filter processing, for example. Thus, even when the actual slip amount (S) temporarily increases or decreases, a temporary increase or decrease in the engine rotational speed for display (Nd) may be suppressed. In other words, fluctuation or variation in the engine rotational speed for display (Nd) is suppressed. Further, Further, it is possible to provide the driver with a visually excellent direct-feeling display of engine speed Nd without impairing the drivability.

4 Claims, 4 Drawing Sheets

(51) Int. Cl.
*G01P 1/04* (2006.01)
*B60R 16/023* (2006.01)

(58) Field of Classification Search
CPC ......... F16H 2059/467; F16H 2061/145; F16H 61/02; G01P 1/04; G01P 3/465
See application file for complete search history.

(56) References Cited

U.S. PATENT DOCUMENTS

| | | | |
|---|---|---|---|
| 2009/0227422 A1* | 9/2009 | Fayyad | F16H 61/143 477/176 |
| 2011/0060509 A1* | 3/2011 | Otanez | F16H 61/143 701/58 |
| 2016/0084874 A1* | 3/2016 | Teratani | G01P 1/07 701/99 |
| 2018/0209870 A1* | 7/2018 | Yamamoto | B60K 35/00 |

FOREIGN PATENT DOCUMENTS

| | | |
|---|---|---|
| JP | 2010-210042 A | 9/2010 |
| JP | 2012-25227 A | 2/2012 |
| JP | 2015-24766 A | 2/2015 |
| JP | 2015-121285 A | 7/2015 |
| WO | WO-2015/005401 A1 | 1/2015 |

\* cited by examiner

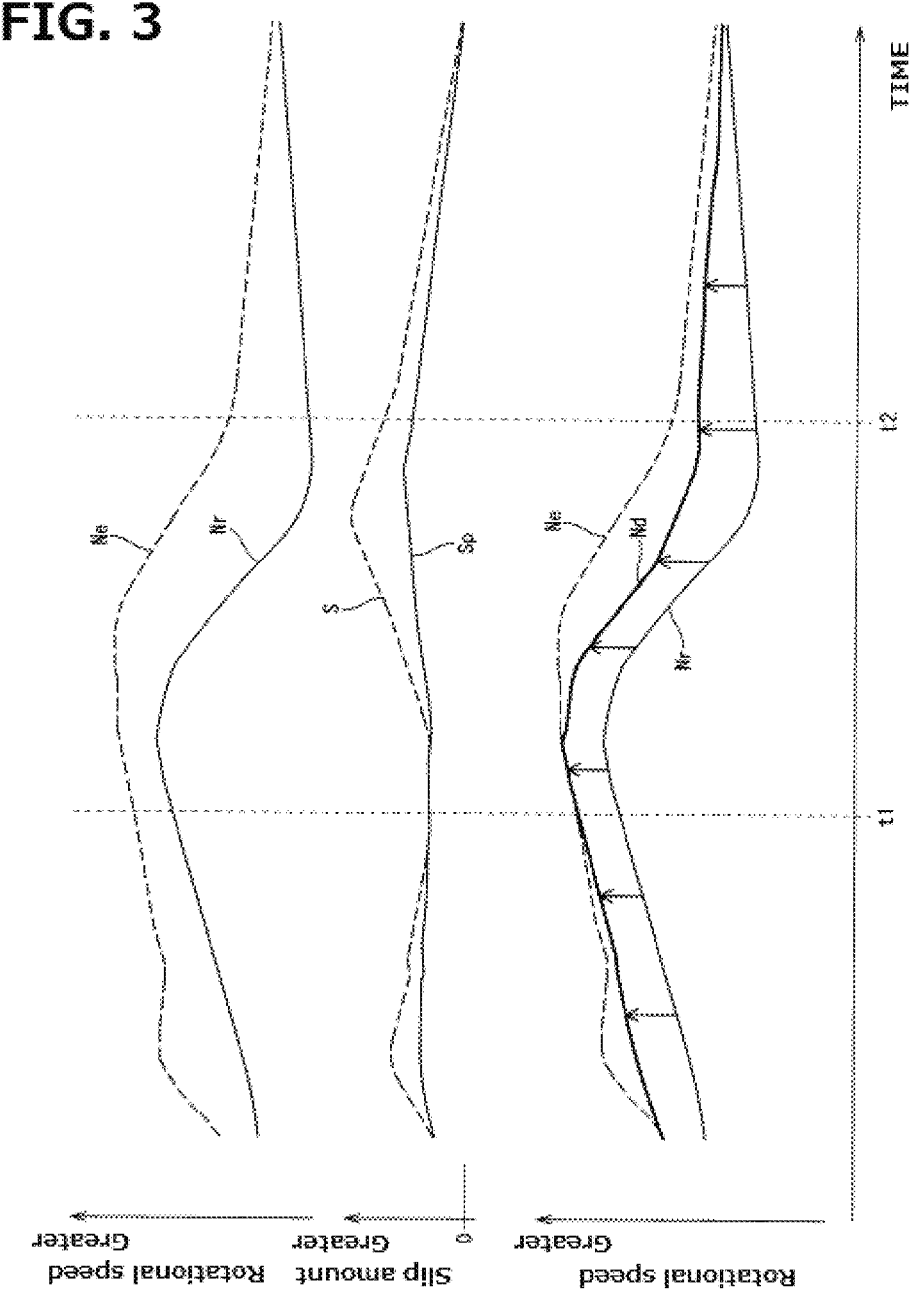

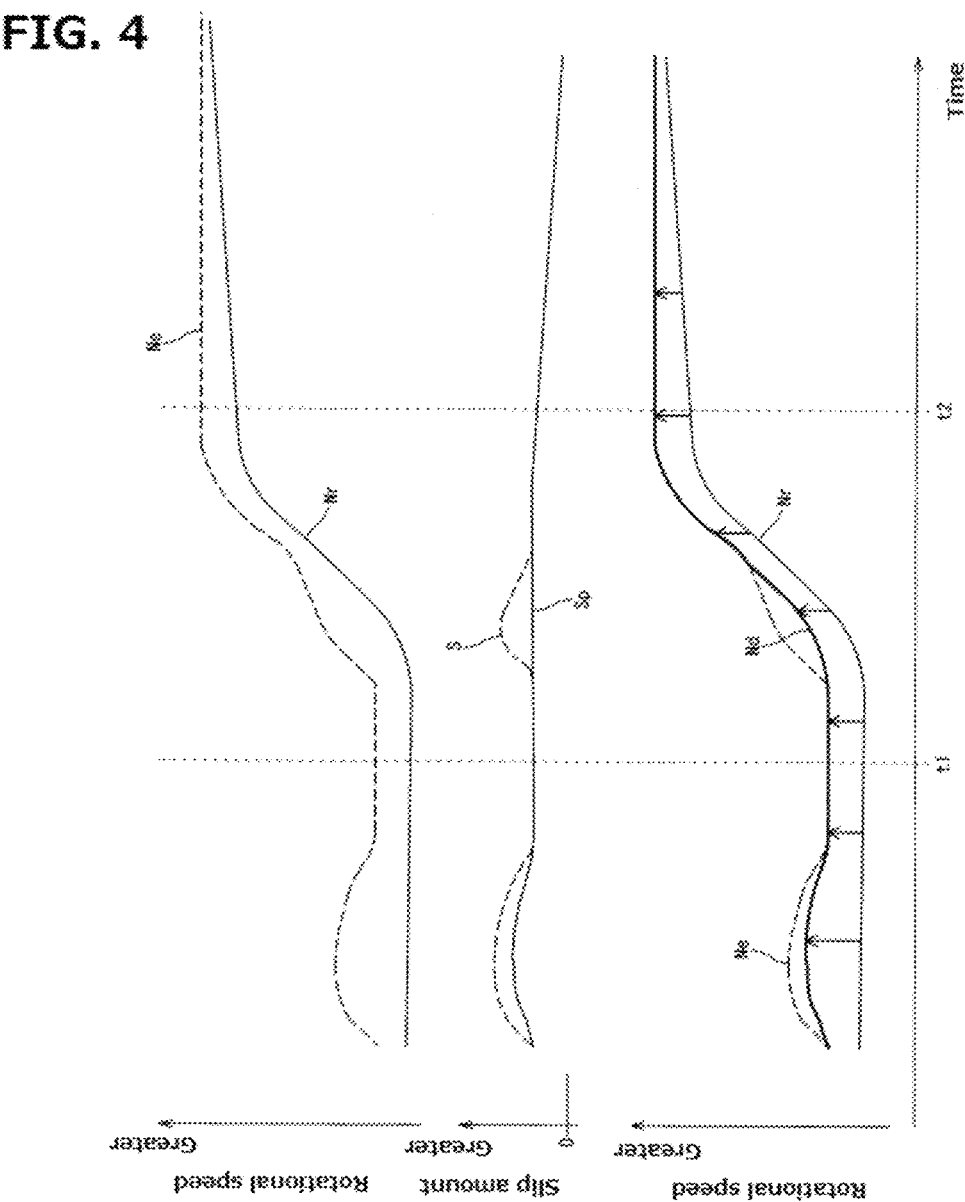

ROTATIONAL SPEED DISPLAY DEVICE

TECHNICAL FIELD

The present invention relates to an in-vehicle rotational speed display device for displaying an engine rotational speed of an internal combustion engine.

Patent Document 1 discloses a rotational speed display device mounted on a vehicle. The vehicle includes an internal combustion engine and an automatic transmission having a torque converter.

In a vehicle equipped with an automatic transmission having a torque converter, in order to improve drivability, it is desirable to keep a slip amount of the torque converter to be constant so that a change in vehicle speed will be proportional to a change in the engine rotational speed like a manual transmission so as to impart a direct feeling.

However, in such a vehicle equipped with an automatic transmission having a torque converter, when attempted to keep the slip amount of the torque converter constant, a sudden change in driving force due to accelerator operation or shift operation causes a longitudinal acceleration fluctuation (so-called shift shock) of the vehicle. Thus, there is a problem that the drivability is deteriorated.

PRIOR ART LITERATURE

Patent Document

Patent Document 1: JP 2009-220678 A

The present invention relates to a rotational speed display device mounted on a vehicle in which a driving force of an internal combustion engine is transmitted to a driving wheel via a torque converter and an automatic transmission, wherein an engine rotational speed for display or a display engine rotational speed is calculated by adding a slip amount for display or a display slip amount to an input shaft rotational speed of the automatic transmission. Further, the display slip amount is calculated by applying a predetermined correction process to an actual slip amount in the said torque converter so as to be equal to or less than the actual slip amount.

According to the present invention, even when the actual slip amount temporarily Increases or decreases, it is possible to suppress the temporary increase/decrease of the display engine speed. In other words, the fluctuation of the engine rotational speed for display is suppressed. Further, it is possible to provide the driver with a visually excellent direct-feeling display of engine speed Nd without impairing the drivability.

BRIEF DESCRIPTION OF THE DRAWINGS

FIG. 3 is a timing chart showing a state in which the automatic transmission shifts up where there is a slip in the torque converter; and FIG. 4 is a timing chart showing a state in which the automatic transmission shifts down where there is a slip in the torque converter.

EMBODIMENTS FOR IMPLEMENTING THE INVENTION

Below, a description if given of an embodiment of the present invention with reference to drawings.

Figure 1:
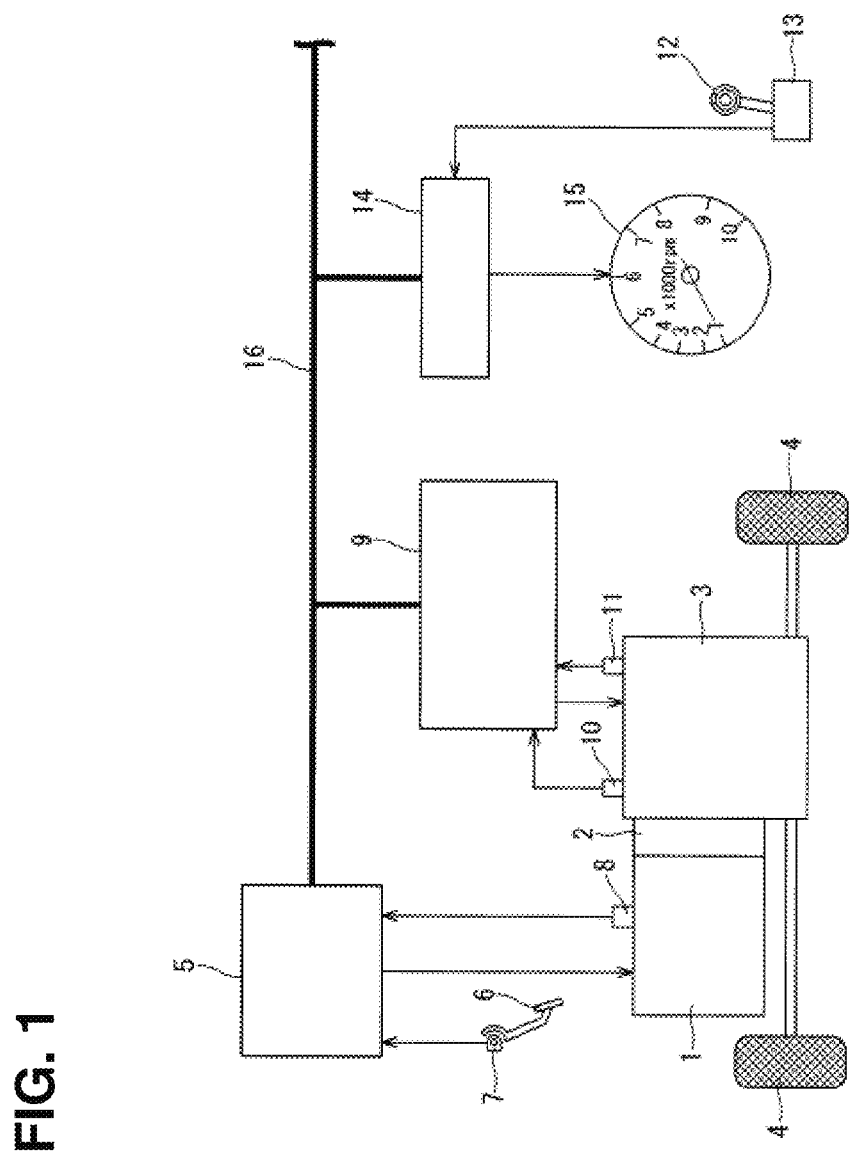
FIG. 1 is an explanatory view schematically showing a system configuration of a vehicle power system to which a rotational speed display device according to the present invention is applied.

FIG. 1 is an explanatory diagram schematically showing a system configuration of a vehicle power system to which a rotational speed display device according to the present invention is applied.

An internal combustion engine 1 is mounted on a vehicle as a driving source. The internal combustion engine 1 is connected to an automatic transmission 3 via a torque converter 2 having a lock-up mechanism. The automatic transmission 3 transmits the driving force of the internal combustion engine 1 to driving wheels 4, 4 via a final reduction gear (not shown).

The internal combustion engine 1 is controlled by an ECM (engine control module) 5. The ECM 5 includes a microcomputer including a CPU, a ROM, a RAM, and the like.

The ECM 5 is provided with signals from various sensors such as an accelerator opening degree sensor 7 for detecting an opening degree (depression amount) of the accelerator pedal 6 operated by the driver, a first sensor 8 for a crankshaft (not shown) sensor for detecting an rotational speed (engine speed Ne). The ECM 5 controls a fuel injection timing, an ignition timing of the internal combustion engine 1, a throttle opening degree, and the like, based on detection signals from these various sensors.

The automatic transmission 3 is a step transmission that realize shift stages such as seven forward speeds and one reverse speed by selectively engaging or disengaging a plurality of friction elements (clutches, brakes, etc.) to thereby combining engagement/disengagement of these frictional elements.

The automatic transmission 3 is controlled by a TCU (transmission control unit) 9. The speed change or shift speed of the automatic transmission 3 is not necessarily constant. In order to suppress a shift shock, the shift speed is determined to adopt, for example, an input torque to the automatic transmission 3, a differential rotational speed before and after the shift, a friction coefficient of the friction engagement element of the automatic transmission 3, and based on a result of feedback control, learning control, and the like.

The TCU 9 includes a microcomputer including a CPU, a ROM, a RAM, and the like. The TCU 9 is provided with signals of various sensors such as an input shaft rotation sensor 10 as a second sensor for detecting a rotational speed of an input shaft (not shown) of the automatic transmission 3, an output shaft rotation sensor 11 as a third sensor for detecting the rotational speed of an output shaft (not shown) of the automatic transmission 3, an inhibitor switch 13 for detecting the operation position of a select lever 12, and the like. The TCU 9 controls shift controlling of the automatic transmission 3 by hydraulic pressure and engagement/disengagement control of a lockup clutch (not shown) of the lockup mechanism based on the signals from these sensors.

Further, the TCU 9 calculates the display engine speed Nd based on signals from various sensors. That is, the TCU 9 corresponds to a calculating unit of the display engine speed.

The display engine speed Nd calculated by the TCU 9 is output to a tachometer 15 as a display unit via a meter CU (meter control unit) 14.

The tachometer 15 is provided on an instrument panel in the vehicle interior, and displays the display engine speed Nd calculated by the TCU 9.

The ECM 5, the TCU 9, and the meter CU 14 are connected by a CAN communication line 16. Data can be exchanged between the ECM 5, the TCU 9, and the meter CU 14 via the CAN communication line 16. Information such as the engine speed Ne and the like is input from the ECM 5 to the TCU 9, and from the meter CU 14, the TCU receives a detection signal such as an inhibitor switch 13 and the like.

Figure 2:
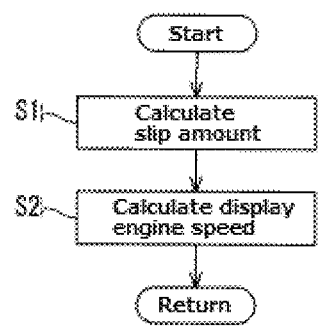
FIG. 2 is a flowchart showing a flow of calculation processing of an engine speed for display or display engine speed.

FIG. 2 is a flowchart showing the flow of calculation processing of the display engine rotational speed Nd calculated by the TCU 9.

In S1, a slip amount in the torque converter 2, i.e., an actual slip amount S is calculated. Specifically, the actual slip amount S is calculated by subtracting an actual input shaft rotational speed Nr of the automatic transmission 3 from an engine rotational speed Ne, which is the rotational speed of the crankshaft. That is, the actual slip amount S is calculated by the following equation (1):

[Equation 1]

$$Ne - Nr = S \quad (1)$$

The engine speed Ne is detected by the crank angle sensor 8. The actual input shaft rotational speed Nr is detected by the input shaft rotation sensor 10.

In S2, a display engine speed Nd to be displayed on the tachometer 15 is calculated. More specifically, by adding a display slip amount Sp subjected to a predetermined correction process to the actual slip amount S calculated in S1 to the actual input shaft rotational speed Nr of the automatic transmission 3, the display engine speed Nd is calculated. That is, the display engine speed Nd is calculated by the following equation (2).

(Equation 2)

$$Nr + Sp = Nd \quad (2)$$

The correction process is intended to obtain a value less than the actual slip amount S by limiting the amount of change in the actual slip amount S. Specifically, the above correction process is, for example, a filter process of a first-order lag. The actual slip amount S is not a constant value. Rather, it fluctuates in accordance with the operating state such as during shifting. Therefore, by subjecting the actual slip amount S to the above-described correction process such as filter processing of first order lag, the display slip amount Sp (solid line) with less fluctuations with respect to the actual slip amount S is calculated. That is, the TCU 9 corresponds to a correction processing unit that performs a predetermined correction process on the actual slip amount S.

When the actual slip amount S of the torque converter 2 is temporarily increased or decreased in order to prevent deterioration of driving performance due to sudden driving force fluctuation due to accelerator operation or gear shift, the engine speed Ne also temporarily increases or decreases.

Therefore, the display engine speed Nd of the present embodiment does not use the actual slip amount S of the torque converter 2. Instead, by applying to the actual slip amount S the above correction process to obtain a slip amount adjusted for display or display slip amount Sp that is then added to the actual input shaft rotational speed Nr of the automatic transmission 3. Therefore, even when the actual slip amount S temporarily increases or decreases, temporary increase/decrease of the display engine rotational speed Nd is suppressed. In other words, fluctuations in the display engine speed Nd is suppressed. Thus, it is possible to provide the driver with a visually excellent direct-feeling display engine speed Nd without impairing drivability.

FIG. 3 is a timing chart showing a state in which the automatic transmission 3 upshifts while there is a slip in the torque converter 2.

When the driver operates the select lever 12 to upshift at the timing of time t1, the automatic transmission 3 starts shifting control. That is, the upshift shift control of the automatic transmission 3 is started from the timing at the time t1. Note that the upshift control itself of the automatic transmission 3 is performed until the timing of time t2.

When the lock-up clutch of the lock-up mechanism is in a released state, the input shaft rotational speed Nr (solid line) of the automatic transmission 3 with respect to the engine rotational speed Ne (broken line) of the internal combustion engine 1 will be a low rotational speed which is shifted by the actual slip amount S (broken line).

By calculating the display engine speed Nd (bold solid line) by adding the display slip amount Sp to the input shaft rotational speed Nr, even when the automatic transmission 3 upshifts, the influence of the fluctuation in the actual slip amount S is suppressed.

FIG. 4 is a timing chart showing a state in which the automatic transmission 3 downshifts while the torque converter 2 is slipping.

At the timing of time t1, when the driver downshifts by operating the select lever 12, the automatic transmission 3 starts shifting control. That is, the upshift control of the automatic transmission 3 is started from time t1. The downshift control itself of the automatic transmission 3 is performed until the timing of time t2.

When the lock-up clutch of the lock-up mechanism is in the released state, the input shaft rotational speed Nr (solid line) of the automatic transmission 3 with respect to the engine rotational speed Ne (broken line) of the internal combustion engine 1 will be low rotational speed which is shifted or lower by the actual slip amount S (broken line).

By calculating the display engine speed Nd (bold solid line) by adding the display slip amount Sp to the input shaft rotational speed Nr, even when the automatic transmission 3 is downshifting, the influence of the fluctuation in the actual slip amount S is suppressed.

As the automatic transmission 3 in the above-described embodiment, it is also possible to use a continuously variable transmission (CVT) or a dual clutch transmission (DCT).

Further, the correction process can be adjusted according to the driving situation. Specifically, when applying the first-order-lag filter processing to the actual slip amount S as the correction processing, it is also possible to change the time constant of the first-order-lag processing according to the driving situation. In this case, since the correction process for the actual slip amount S can be adjusted according to the driving situation, it is possible to provide the driver with an enhanced visually excellent direct-feeling display engine speed Nd. Incidentally, examples of the driving situation here include a driving operation of the driver, a driving tendency of the driver, a running state, driving information of the automatic transmission 3, and the like. The driving operation of the driver is, for example, a state in which an accelerator pedal is depressed (on state) and a state in which it is not depressed (off state), and the like. The driving tendency of the driver may refer to, for example, a strong driving intention of acceleration/deceleration, operation or a less strong intention of acceleration/deceleration, and the like. The running state may be, for example, a stopped state, running state, and the like. The driving information of the automatic transmission 3 may include, for example, upshift, downshift and the like.

The display engine speed Nd may be calculated by adding the display slip amount Sp to the actual input shaft rotational speed Nr of the automatic transmission 3 and further correcting with a predetermined correction value that is different from the display slip amount Sp (for example, by way of addition, subtraction, multiplication, and division). In this case, the correction based on the predetermined correction value does not substantially correct the value obtained by adding the display slip amount Sp to the actual input shaft rotational speed Nr of the automatic transmission 3 to a large extent. Rather, the correction is auxiliary or supplementary, and performed after adding the display slip amount Sp to the actual input shaft rotational speed Nr. In other words, the correction by the correction value is made by a small amount such that the addition of the display slip amount Sp to the actual input shaft rotational speed Nr will not be canceled out.

The invention claimed is:

1. An engine rotational speed display device mounted on a vehicle in which a driving force of an internal combustion engine is transmitted to a driving wheel via a torque converter and an automatic transmission, the engine rotational speed display device comprising:
    a display unit; and
    a processor coupled to a non-transitory memory and configured to read instructions from the non-transitory memory to cause the engine rotational speed display device to perform operations comprising:
    calculating a display engine rotational speed for display on the display unit by adding a display slip amount to an actual input shaft rotational speed of the automatic transmission;
    calculating the display slip amount by applying a predetermined correction process to an actual slip amount in the torque converter so as to be less than the actual slip amount, wherein the actual slip amount fluctuates in accordance with an operating state;
    applying the correction process such that fluctuations in the display slip amount will be less than fluctuations in the actual slip amount; and
    displaying the display engine rotational speed on the display unit.

2. The engine rotational speed display device according to claim 1, wherein the correction process is adjusted according to a driving situation.

3. The engine rotational speed display device according to claim 1 wherein the correction process is a first order lag process.

4. The engine rotational speed display device according to claim 3, wherein a time constant of the first order lag processing is changed according to the driving situation.

* * * * *